United States Patent
Jeong et al.

(10) Patent No.: US 10,672,093 B2
(45) Date of Patent: Jun. 2, 2020

(54) DELIVERY ORDER RELAYING SYSTEM USING TTS AND METHOD THEREFOR

(71) Applicant: WOOWA BROTHERS CO., LTD., Seoul (KR)

(72) Inventors: Nak Jeong Jeong, Seoul (KR); Chan Jung Kim, Seoul (KR)

(73) Assignee: WOOWA BROTHERS CO., LTD., Seoul (KR)

( * ) Notice: Subject to any disclaimer, the term of this patent is extended or adjusted under 35 U.S.C. 154(b) by 0 days.

(21) Appl. No.: 15/559,398

(22) PCT Filed: Mar. 10, 2016

(86) PCT No.: PCT/KR2016/002381
§ 371 (c)(1),
(2) Date: Sep. 18, 2017

(87) PCT Pub. No.: WO2016/148436
PCT Pub. Date: Sep. 22, 2016

(65) Prior Publication Data
US 2018/0075564 A1    Mar. 15, 2018

(30) Foreign Application Priority Data
Mar. 17, 2015  (KR) .................. 10-2015-0036881

(51) Int. Cl.
*G10L 13/04*    (2013.01)
*G06Q 50/28*    (2012.01)
(Continued)

(52) U.S. Cl.
CPC ............. *G06Q 50/28* (2013.01); *G06F 3/167* (2013.01); *G06Q 10/04* (2013.01);
(Continued)

(58) Field of Classification Search
USPC ............ 704/260, 270.1, 275; 705/26.1–26.9, 705/27.1
See application file for complete search history.

(56) References Cited

U.S. PATENT DOCUMENTS

| | | | | |
|---|---|---|---|---|
| 5,991,739 A | * | 11/1999 | Cupps .................... | G06Q 10/08 705/26.61 |
| 6,236,979 B1 | * | 5/2001 | Kawabata .............. | G06Q 30/02 705/26.81 |

(Continued)

FOREIGN PATENT DOCUMENTS

| KR | 2001-0088694 A | 9/2001 |
|---|---|---|
| KR | 10-2008-0044606 A | 5/2008 |

(Continued)

OTHER PUBLICATIONS

International Search Report dated Jun. 27, 2016 of PCT/KR2016/002381 which is the parent application and its English translation—4 pages.

(Continued)

*Primary Examiner* — Abul K Azad
(74) *Attorney, Agent, or Firm* — Knobbe Martens Olson & Bear LLP

(57) ABSTRACT

A delivery order relaying system is disclosed. The system comprises: an order receiving module for receiving a delivery order, to be processed, which is transmitted from an orderer terminal; a TTS module for generating, through TTS, a voice delivery order corresponding to the delivery order to be processed; a voice output module for connecting a phone call to a vendor corresponding to the delivery order to be processed, and outputting the voice delivery order through the connected phone call; a response receiving module for receiving, from the vendor through the phone call, an order response to the delivery order to be processed; and a delivery order response module for transmitting order (Continued)

processing result information, corresponding to the order response, to the orderer terminal having transmitted the delivery order to be processed.

7 Claims, 6 Drawing Sheets

(51) Int. Cl.

| | |
|---|---|
| *G06Q 50/12* | (2012.01) |
| *G10L 13/00* | (2006.01) |
| *G06Q 10/08* | (2012.01) |
| *G06Q 10/04* | (2012.01) |
| *G06F 3/16* | (2006.01) |
| *G06Q 10/06* | (2012.01) |
| *G06Q 30/06* | (2012.01) |
| *H04M 1/725* | (2006.01) |
| *H04W 4/14* | (2009.01) |

(52) U.S. Cl.
CPC ..... *G06Q 10/06316* (2013.01); *G06Q 10/083* (2013.01); *G06Q 30/0635* (2013.01); *G06Q 50/12* (2013.01); *G10L 13/00* (2013.01); *G10L 13/043* (2013.01); *H04M 1/72552* (2013.01); *H04W 4/14* (2013.01)

(56) References Cited

U.S. PATENT DOCUMENTS

| | | | |
|---|---|---|---|
| 8,103,558 B2 * | 1/2012 | Glasglow | G06Q 10/101 705/26.1 |
| 2008/0095333 A1 * | 4/2008 | Tudor | H04L 12/1818 379/88.17 |
| 2010/0036926 A1 * | 2/2010 | Ahart | G06Q 10/10 709/206 |
| 2010/0293066 A1 * | 11/2010 | Kimi | G06Q 20/12 705/26.81 |
| 2014/0105372 A1 * | 4/2014 | Nowack | H04M 15/8044 379/121.01 |
| 2015/0149560 A1 * | 5/2015 | Lee | H04L 51/066 709/206 |
| 2015/0193858 A1 * | 7/2015 | Reed | G06Q 30/0633 705/26.8 |
| 2015/0262272 A1 * | 9/2015 | Matsumoto | G06Q 30/0609 705/26.35 |
| 2016/0171439 A1 * | 6/2016 | Ladden | G06Q 10/0832 705/340 |

FOREIGN PATENT DOCUMENTS

| | | |
|---|---|---|
| KR | 10-2009-0014935 A | 2/2009 |
| KR | 10-2011-0003992 A | 1/2011 |
| KR | 10-2011-0010431 A | 2/2011 |
| KR | 10-2013-0065744 B1 | 6/2013 |
| KR | 10-2013-0097905 A | 9/2013 |
| KR | 10-2014-0133048 A | 11/2014 |

OTHER PUBLICATIONS

Naver Blog. "[BAEDALTONG] My shop Advertisement Service for Business Owner", Feb. 17, 2015, downloaded from http://blog/naver.com/honjason/220276102462 on May 30, 2016.

* cited by examiner

FIG. 3

[Delivery order contents]

1. Delivery company name: ~~~
2. Order history (delivery product)
   - ~~~
   - ~~~
3. Request: ~~~
4. Payment means: Credit card payment
5. Delivery location address: ~~~
6. Order number: ~~~

DELIVERY ORDER RELAYING SYSTEM USING TTS AND METHOD THEREFOR

TECHNICAL FIELD

The present invention relates to a delivery order relay system and method using text to speech (TTS) and, more particularly, to system and method for relaying a delivery order requested by the terminal of an orderer to a delivery company in a voice form using TTS.

BACKGROUND ART

In general, in order to order a delivery product, such as delivery food, a process of checking a list of orderable products through a flyer or webpage provided by a corresponding company, selecting one of the products, and placing an order with the corresponding company for the selected product is performed.

However, to select required products one by one through the above process with respect to many delivery companies consume a lot of time and efforts. Accordingly, recently, there are emerging Internet services for arranging a plurality of menus, provided by a plurality of delivery companies, for each company in an easily accessible manner and providing the menus through a franchise relation established with the plurality of delivery companies. Furthermore, some of the Internet services also provide a delivery order relay service for providing an application so that a user can select a menu and give an order for the selected menu. In general, a relay company that provides the conventional delivery order relay service provides a relay service through a method of instructing a product requested by an orderer to be delivered by directly making a call to a delivery company corresponding to a delivery order when the delivery order is received from the orderer.

However, such a conventional delivery order relay method has a problem in that a lot of manpower is consumed because a number of employees who must directly make a call to a delivery company are required.

Furthermore, there are problems in that an error may occur in a transfer process because delivery order information inputted by an orderer must be transferred through voice and the transfer of a delivery order cannot be rapidly transferred.

PRIOR ART DOCUMENT

Patent Document

1. Korean Patent Application Publication No. 10-2007-0049951
2. Korean Patent Application Publication No. 10-2008-0100154
3. Korean Patent Application Publication No. 10-2006-0040782

DISCLOSURE

Technical Problem

The present invention has been made to solve the above problems occurring in the prior art and an object of the present invention is to provide a system and method capable of relaying a delivery order to a delivery company using TTS.

Technical Solution

In accordance with one aspect of the present invention, there is provided a delivery order relay system using text to speech (TTS), including an order reception module which receives a to-be-processed delivery order from an orderer terminal, a TTS module which generates a voice delivery order corresponding to the to-be-processed delivery order through TTS, a voice output module which connects a phone call to a company corresponding to the to-be-processed delivery order and outputs the voice delivery order through the connected phone call, a response reception module which receives an order response to the to-be-processed delivery order from the company through the phone call, and a delivery order response module which sends order processing result information corresponding to the order response to the orderer terminal which has transmitted the to-be-processed delivery order.

In one embodiment, the delivery order relay system may further include a text message transmission module which sends a text message corresponding to the to-be-processed delivery order to the terminal of the company.

In one embodiment, the delivery order relay system may further include an addition module which adds a processing task of the to-be-processed delivery order to a task queue of a first-in first-out method, an extraction module which sequentially extracts tasks to the task queue, and a control module which controls the voice output module so that the voice output module connects the phone call to the company corresponding to the to-be-processed delivery order and outputs the voice delivery order through the connected phone call when the extraction module extracts the processing task of the to-be-processed delivery order from the task queue.

In one embodiment, the delivery order relay system may further include a cancellation request reception module which receives a cancellation request for the to-be-processed delivery order from the orderer terminal and a cancellation module which performs a cancellation task on the to-be-processed delivery order in response to the cancellation request for the to-be-processed delivery order. The cancellation module may delete the to-be-processed delivery order from the task queue if a phone call has not yet been connected to the company corresponding to the to-be-processed delivery order. The cancellation module may add a cancellation message transmission task of the to-be-processed delivery order to the task queue with top priority if the voice delivery order is output through the phone call connected to the company corresponding to the to-be-processed delivery order. The control module may transmit a cancellation instruction message for the to-be-processed delivery order corresponding to the cancellation request for the to-be-processed delivery order to the terminal of the company if the extraction module has extracted the cancellation message transmission task of the to-be-processed delivery order from the task queue.

In one embodiment, the cancellation module may perform the cancellation task on the to-be-processed delivery order if a specific cancellable period has not elapsed. The cancellable period may be a period until the order response to the to-be-processed delivery order is received from the company.

In one embodiment, the voice output module may attempt the connection of the phone call to the company again after a specific standby period elapses if the phone call is not connected to the company.

In one embodiment, the delivery order relay system may further include a cancellation module which cancels the to-be-processed delivery order if the phone call is not connected to the company within a specific limit period after a first phone call connection attempt for the company.

In one embodiment, the delivery order relay system may further include a replay number transmission module which sends a replay number to the terminal of the company if the phone call is hung up while the voice delivery order is output through the phone call connected to the company corresponding to the to-be-processed delivery order. The voice output module outputs the voice delivery order again through a connected phone call when the company is connected to the delivery order relay system through the phone call using the replay number.

In one embodiment, when the response reception module receives an acceptance response to the to-be-processed delivery order, the voice output module may output a voice to question about an expected delivery time through the phone call, the response reception module may receive expected delivery time information from the company through the phone call, and the delivery order response module may send the order processing result information including the expected delivery time information to the orderer terminal. When the response reception module receives a rejection response to the to-be-processed delivery order, the voice output module may output a voice to question about a receipt rejection reason through the phone, the response reception module may receive receipt rejection reason information from the company through the phone call, and the delivery order response module may send the order processing result information including the receipt rejection reason information to the orderer terminal.

In accordance with another aspect of the present invention, there is provided a delivery order relay method using TTS, including an order reception step of receiving, by a delivery order relay system, a to-be-processed delivery order from an orderer terminal, a TTS step of generating, by the delivery order relay system, a voice delivery order corresponding to the to-be-processed delivery order through TTS, a voice output step of connecting, by the delivery order relay system, a phone call to a company corresponding to the to-be-processed delivery order and outputting the voice delivery order through the connected phone call, a response reception step of receiving, by the delivery order relay system, an order response to the to-be-processed delivery order from the company through the phone call, and a delivery order response step of sending, by the delivery order relay system, order processing result information corresponding to the order response to the orderer terminal which has transmitted the to-be-processed delivery order.

In one embodiment, the delivery order relay method may further include a text message transmission step of sending, by the delivery order relay system, a text message corresponding to the to-be-processed delivery order to the terminal of the company.

In one embodiment, the delivery order relay method may further include an addition step of adding, by the delivery order relay system, a processing task of the to-be-processed delivery order to a task queue of a first-in first-out method and an extraction step of sequentially extracting, by the delivery order relay system, tasks to the task queue. The voice output step may be performed when the processing task of the to-be-processed delivery order is extracted from the task queue.

In one embodiment, the delivery order relay method may further include a cancellation request reception step of receiving, by the delivery order relay system, a cancellation request for the to-be-processed delivery order from the orderer terminal and a cancellation step of performing, by the delivery order relay system, a cancellation task on the to-be-processed delivery order in response to the cancellation request for the to-be-processed delivery order. The cancellation task on the to-be-processed delivery order may include the steps of deleting the to-be-processed delivery order from the task queue if a phone call has not yet been connected to the company corresponding to the to-be-processed delivery order and of adding a cancellation message transmission task of the to-be-processed delivery order to the task queue with top priority if the voice delivery order is output through the phone call connected to the company corresponding to the to-be-processed delivery order. The delivery order relay method may further include the step of transmitting a cancellation instruction message for the to-be-processed delivery order corresponding to the cancellation request for the to-be-processed delivery order to the terminal of the company if the cancellation message transmission task of the to-be-processed delivery order is extracted from the task queue.

In one embodiment, the cancellation step may include the step of performing, by the delivery order relay system, the cancellation task on the to-be-processed delivery order in response to the cancellation request for the to-be-processed delivery order if a specific cancellable period has not elapsed. The cancellable period may be a period until the order response to the to-be-processed delivery order is received from the company.

In one embodiment, the voice output step may include the step of attempting the connection of the phone call to the company again after a specific standby period elapses if the phone call is not connected to the company.

In one embodiment, the delivery order relay method may further include the step of cancelling the to-be-processed delivery order if the phone call is not connected to the company within a specific limit period after a first phone call connection attempt for the company.

In one embodiment, the delivery order relay method may further include the steps of sending a replay number to the terminal of the company if the phone call is hung up while the voice delivery order is output through the phone call connected to the company corresponding to the to-be-processed delivery order and of outputting the voice delivery order again through a connected phone call when the company is connected to the delivery order relay system through the phone call using the replay number.

In one embodiment, the delivery order relay method may further include the steps of outputting, by the delivery order relay system, a voice to question about an expected delivery time through the phone call and receiving expected delivery time information from the company through the phone call when an acceptance response to the to-be-processed delivery order is received and of outputting, by the delivery order relay system, a voice to question about a receipt rejection reason through the phone and receiving receipt rejection reason information from the company through the phone call. When the acceptance response to the to-be-processed delivery order is received, the order processing result information may include the expected delivery time information. When the acceptance response to the to-be-processed delivery order is received, the order processing result information may include the order rejection reason information.

In accordance with another aspect of the present invention, there is provided a computer program for performing the aforementioned method installed in a data processing device and stored in a recording medium.

In accordance with another aspect of the present invention, there is provided a delivery order relay system, including a processor, and memory storing a computer program executed by the processor.

The computer program enables the delivery order relay system to execute the aforementioned method when the computer program is executed by the processor.

Advantageous Effects

In accordance with an embodiment of the present invention, there is an effect in that a conventional problem in that a lot of manpower is consumed for the transfer and response of a received delivery order can be solved because a delivery order voice to be delivered to a delivery company is automatically generated using TTS and transferred to a delivery establishment.

Furthermore, in accordance with an embodiment of the present invention, there can be provided a technological spirit in which delivery orders requested by a plurality of orderers can be effectively managed through a queue and a cancellation request for a requested delivery order can be effectively processed.

Furthermore, there can be provided a technological spirit in which the transfer process of a delivery order can resume although a call with a delivery company is hung up while the delivery order is delivered to a delivery company. There can be provided a technological spirit in which a case where a phone call with a delivery company is not performed for a reason of the delivery company can be effectively handed.

DESCRIPTION OF DRAWINGS

A brief description of each drawing is provided in order to more sufficiently understand the drawings cited in the detailed description of the present invention.

FIG. 3 is a diagram showing an example of a text message transmitted by the delivery order relay system according to an embodiment of the present invention.

BEST MODE FOR INVENTION

Figure 1:
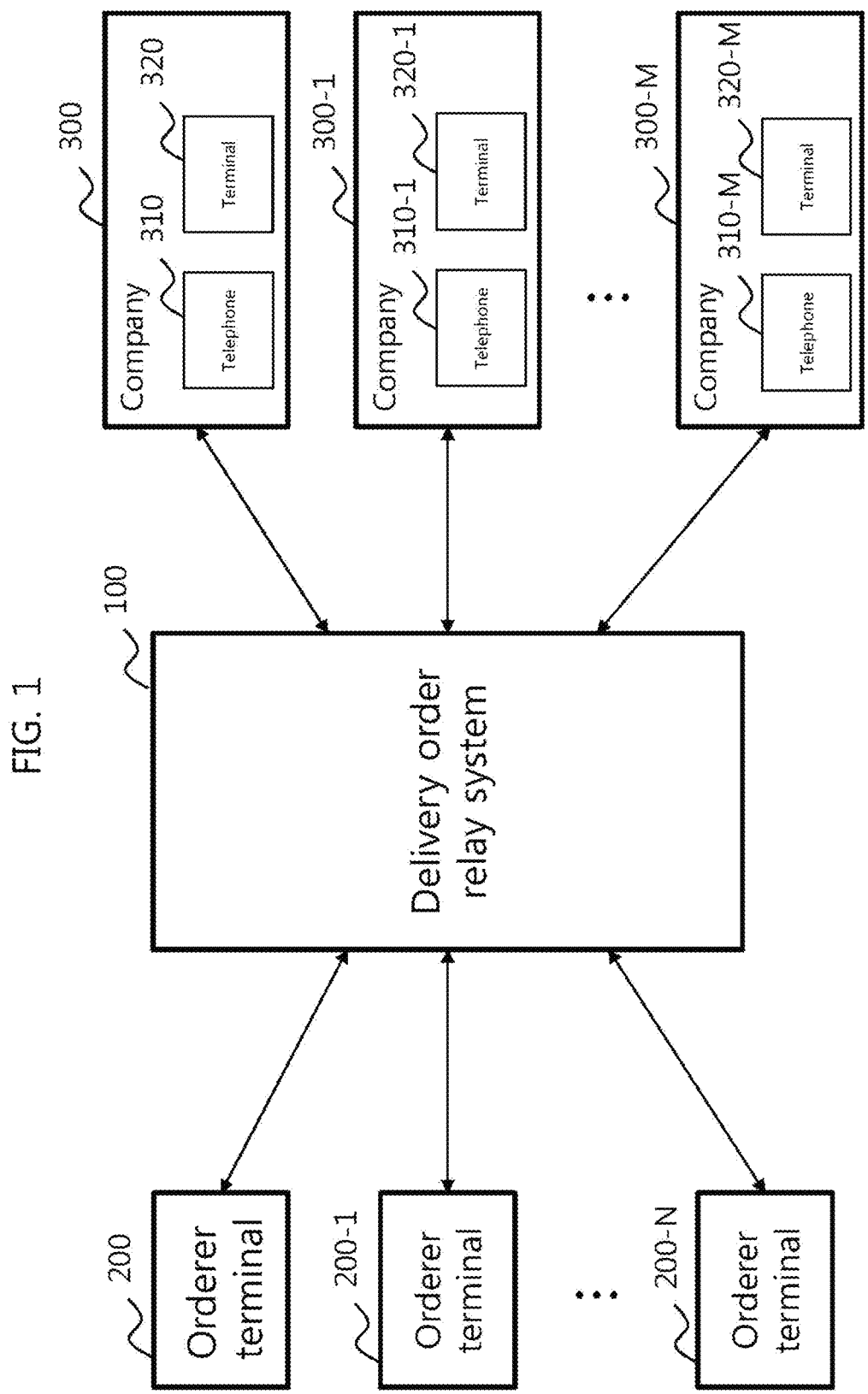
FIG. 1 is a diagram schematically illustrating an environment in which a delivery order relay system according to an embodiment of the present invention is configured.

The present invention may be modified in various ways and may have some embodiments. Specific embodiments are to be illustrated in the drawings and are to be described the detailed description. It is however to be understood that the present invention is not intended to be limited to the specific embodiments of the present invention, but that the specific embodiments include all of modifications, equivalents and/or substitutions which fall within the spirit and technological scope of the present invention. In describing the present invention, a detailed description of the known technologies will be omitted if it is deemed to make the gist of the present invention unnecessarily vague.

Terms, such as the first and the second, may be used to describe various elements, but the elements should not be restricted by the terms. The terms are used to only distinguish one element from the other element.

The terms used in this application are used to only describe specific embodiments and are not intended to restrict the present invention. An expression of the singular number includes an expression of the plural number unless clearly defined otherwise in the context.

In this specification, terms, such as "include (or comprise)" or "have", are intended to designate that characteristics, numbers, steps, operations, elements, or parts which are described in the specification, or a combination of them exist, and should not be understood that they exclude the existence or possible addition of one or more other characteristics, numbers, steps, operations, elements, parts, or combinations of them in advance.

Furthermore, in this specification, if one element "send or transmit" data to the other element, this means that one element may directly send the data to the other element or may send the data to the other element through at least another element. In contrast, if one element "directly sends" data to the other element, this means that the data is transmitted from one element to the other element without the intervention of another element.

Hereinafter, the present invention is described in detail based on embodiments of the present invention with reference to the accompanying drawings. The same reference numerals proposed in the drawings denote the same member.

FIG. 1 is a diagram schematically illustrating an environment in which a delivery order relay system according to an embodiment of the present invention is configured.

As shown in FIG. 1, the delivery order relay system 100 may relate delivery orders, requested by orderer terminals 200 to 200-N, to delivery companies 300 to 300-M.

The delivery order relay system 100 may be connected to the orderer terminals 200 to 200-N over a wired/wireless network and may send and receive various types of data and/or information necessary to implement the technological spirit of the present invention. For example, the delivery order relay system 100 may receive a delivery order from the orderer terminal (e.g., 200) and transmit the results of the processing of the delivery order to the orderer terminal (e.g., 200).

Each of the orderer terminals 200 to 200-N may be a data processor including a desktop or a laptop, and may be preferably a mobile device, including a portable phone, a smartphone, a tablet PC or a personal digital assistant (PDA), a wireless computing device including a handheld device having another wireless access function or a processing device connected to another wireless modem.

Each of the delivery companies 300 to 300-M to which the delivery order relay system 100 relays a delivery order received from the orderer terminal (e.g., 200) may have each of telephones 310 to 310-M for performing a phone call with the delivery order relay system 100 within each of business establishments, and may include each of separate terminals 320 to 320-M for receiving a text message from the delivery order relay system 100 or performing data communication with the delivery order relay system 100. Each of the terminals 320 to 320-M may be a data processor including a desktop or a laptop, and may be preferably a mobile device, including a portable phone, a smartphone, a tablet PC or a PDA, a wireless computing device including a handheld device having another wireless access function or a processing device connected to another wireless modem.

Meanwhile, as described above, the delivery order relay system 100 may relay a delivery order. To this end, the delivery order relay system 100 may store/manage information about the plurality of member companies 300 to 300-M that have joined the delivery order relay system 100 and information about delivery products provided by the member companies 300 to 300-M in a specific DB (not shown). The delivery order relay system 100 may provide the orderer terminal (e.g., 200) that has accessed the delivery order relay system 100 with information about the plurality of member companies and information about the plurality of delivery products provided by the member companies so that an orderer corresponding to the orderer terminal 200 can select ones of the plurality of member companies and the plurality of delivery products and request a delivery order for the selected delivery product. Meanwhile, when an orderer sends a delivery order to the delivery order relay system 100, the delivery order relay system 100 may connect a phone call to the telephone (e.g., 310) of a company (e.g., 300) corresponding to the delivery order and transfer the delivery order. Alternatively, the delivery order relay system 100 may transmit a text message, including contents related to the delivery order, to the terminal (e.g., 320) of the company (e.g., 300).

Figure 2:
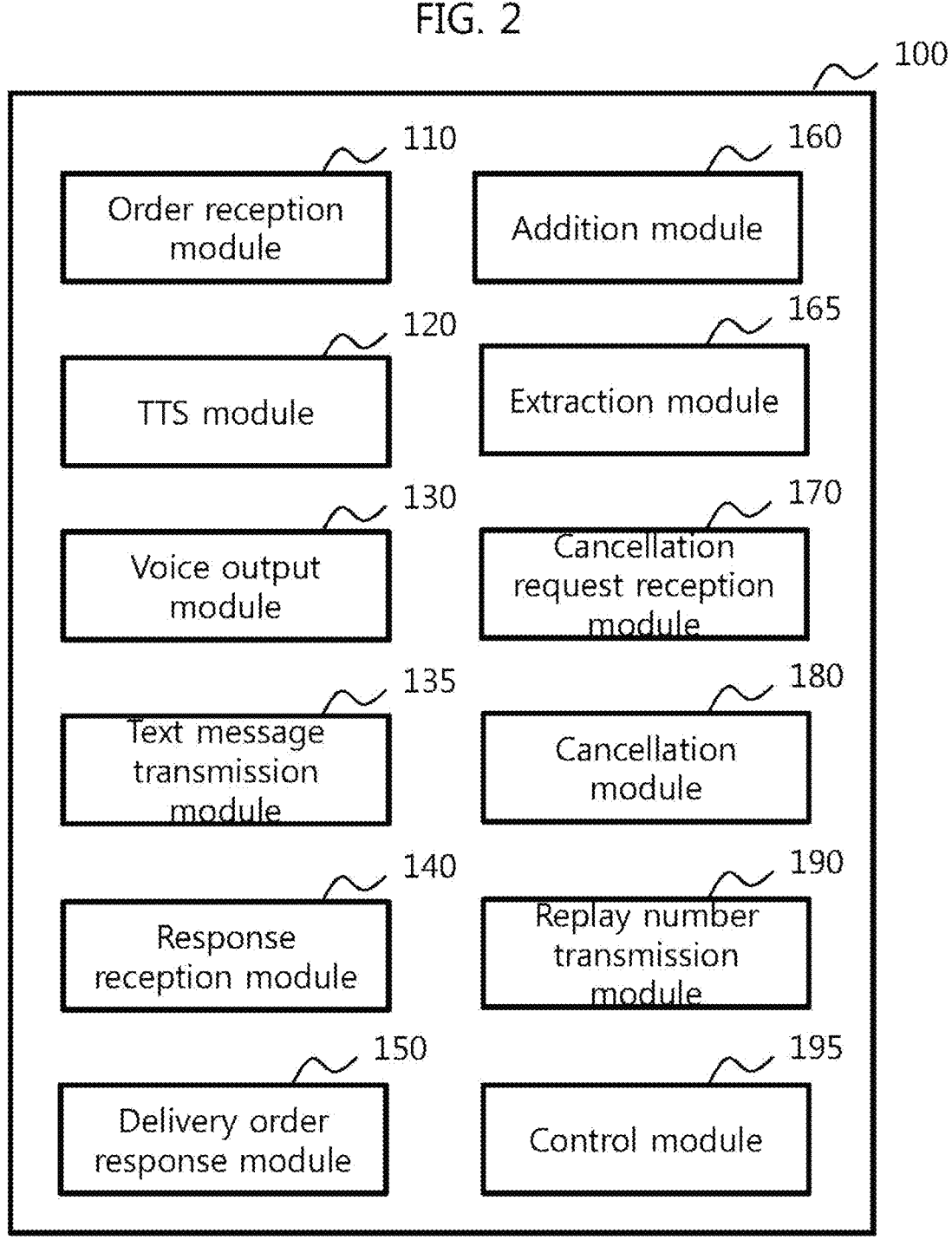
FIG. 2 is a block diagram showing a schematic configuration of the delivery order relay system according to an embodiment of the present invention.

FIG. 2 is a block diagram showing a schematic configuration of the delivery order relay system according to an embodiment of the present invention.

Referring to FIG. 2, the delivery order relay system 100 may include an order reception module 110, a TTS module 120, a voice output module 130, a text message transmission module 135, a response reception module 140, a delivery order response module 150, an addition module 160, an extraction module 165, a cancellation request reception module 170, a cancellation module 180, a replay number transmission module 190 and a control module 195. In one embodiment of the present invention, some of the elements of FIG. 2 may not correspond to elements essentially necessary to implement the present invention. Furthermore, in some embodiments, the delivery order relay system 100 may include elements more than or less than the aforementioned elements.

The delivery order relay system 100 may include hardware resources and/or software necessary to implement the technological spirit of the present invention and does not necessarily mean one physical element or one device. That is, the delivery order relay system 100 may mean a logical combination of hardware and/or software provided to implement the technological spirit of the present invention and may be implemented as a set of logical elements which are disposed in isolated devices to implement the technological spirit of the present invention by performing respective functions, if necessary. Furthermore, the delivery order relay system 100 may mean a set of elements separately implemented according to respective functions or roles for implementing the technological spirit of the present invention. For example, the order reception module 110, the TTS module 120, the voice output module 130, the text message transmission module 135, the response reception module 140, the delivery order response module 150, the addition module 160, the extraction module 165, the cancellation request reception module 170, the cancellation module 180, the replay number transmission module 190 and/or the control module 195 may be located at different physical devices or may be located at the same physical device. Furthermore, in some implementation examples, detailed elements that form the order reception module 110, the TTS module 120, the voice output module 130, the text message transmission module 135, the response reception module 140, the delivery order response module 150, the addition module 160, the extraction module 165, the cancellation request reception module 170, the cancellation module 180, the replay number transmission module 190 and/or the control module 195, respectively, may be located at different physical devices. The detailed elements located at the different physical devices may be organically combined to realize the functions performed by the respective modules.

Furthermore, in this specification, the module may mean a functional and structural combination of hardware for performing the technological spirit of the present invention and software for driving the hardware. For example, the module may mean a logical unit of specific code and hardware resources by which the specific code is performed, and those skilled in the art may readily infer that the module does not necessarily mean pieces of code that are physically connected or one kind of hardware.

Hereinafter, an example in which the delivery order relay system 100 relays the orderer terminal 200 and the company terminal 300 is described, for convenience of description, but a person having ordinary skill in the art to which the present invention pertains may easily understand that the delivery order relay system 100 may relay other orderer terminals (i.e., 200-1 to 200-N) and the terminals (i.e., 300-1 to 300-M) of other member companies.

The control module 195 may control the functions and/or resources of the elements (e.g., the order reception module 110, the TTS module 120, the voice output module 130, the text message transmission module 135, the response reception module 140, the delivery order response module 150, the addition module 160, the extraction module 165, the cancellation request reception module 170, the cancellation module 180 and/or the replay number transmission module 190) included in the delivery order relay system 100.

The order reception module 110 may receive a to-be-processed delivery order transmitted by the orderer terminal 200. In some embodiments, before the order reception module 120 receives a delivery order from the orderer terminal 200, information about the member companies 300 to 300-M that have joined the delivery order relay system 100 and/or information about delivery products provided by the member companies 300 to 300-M may be provided to the orderer terminal 200 so that a member company (e.g., 300) of the delivery order relay system 100 can be selected or a delivery order for a delivery product provided by the selected member company can be requested in the orderer terminal 200.

When the member company 300 and a delivery product provided by the member company are selected in the orderer terminal 200 and the orderer terminal 200 transmits a to-be-processed delivery order for the delivery of the delivery product to the member company, the order reception module 110 may receive the to-be-processed delivery order. The to-be-processed delivery order transmitted by the orderer terminal 200 may include information about the delivery company and delivery product selected by an orderer. Furthermore, the to-be-processed delivery order may further include information about a separate request from the orderer, information about payment means and/or delivery location address information to which the delivery product will be delivered.

Meanwhile, the TTS module 120 may generate a voice delivery order corresponding to the to-be-processed delivery order through TTS. The TTS module 120 may generate the voice delivery order through voice synthesis. The voice synthesis is a technology in which a sound wave of a tone of voice is automatically generated by a machine, and is a technology in which a tone of voice of a person is recorded, segmented in a specific voice unit and stored and only required voice units are combined to artificially produce a tone of voice in response to an instruction. Accordingly, the voice delivery order, that is, the results of the generation of the TTS module 120, may be voice data that can be heard by a person.

In one embodiment, the TTS module 120 may generate text, including individual information (e.g., a delivery company, a delivery product, a request, payment means and an address) included in the to-be-processed delivery order and a unique order number capable of identifying the to-be-processed delivery order, and may generate voice delivery order corresponding to the text generated through voice synthesis.

For example, the voice delivery order may include contents, such as "This is a delivery order requested from a delivery company ~~~. The order number is ~~~~. A delivery product is ~~~~. A delivery address is ~~~~. Please press No. 1 for an order receipt and No. 0 for order rejection."

Meanwhile, the voice output module 130 may connect a phone call to the telephone 310 of the company 300 corresponding to the to-be-processed delivery order and output the voice delivery order through the connected phone call so that an employee or administrator of the company 300 can check the contents of the delivery order by listening to the voice delivery order through the telephone 310.

As described above, the delivery order relay system 100 according to the technological spirit of the present invention can automatically generate voice data corresponding to a delivery order through TTS and transfer the generated voice data to a company through a call. Accordingly, in accordance with the technological spirit of the present invention, a delivery order can be relayed through a call even without a separate employee who makes a phone call to a member company and delivers the contents of the delivery order through voice.

Meanwhile, the text message transmission module 135 may transmit a text message, corresponding to the to-be-processed delivery order, to the terminal 320 of the company 300 so that the contents of the to-be-processed delivery order do not need to be separately written in the company 300 that receives a delivery order through a call. Meanwhile, the terminal 320 may have a function capable of receiving a text message.

In some embodiments, the text message transmission module 135 may transmit a text message through a text message transmission platform, such as short message service (SMS) and long message service (LMS), and may transmit a text message through data communication.

The text message corresponding to the to-be-processed delivery order may include a variety of types of information included in the to-be-processed delivery order and a unique order number capable of identifying the to-be-processed delivery order.

FIG. 3 is a diagram showing an example of a text message transmitted by the text message transmission module 135. As shown in FIG. 3, the text message corresponding to the to-be-processed delivery order may include a delivery company name, a delivery product, a request, payment means, a delivery location address, an order number, and so on.

An employee or administrator of the company 300 who has received the to-be-processed delivery order through a phone call may input an order response to the to-be-processed delivery order through the phone call. The response reception module 140 may receive the order response to the to-be-processed delivery order from the company through the phone call.

The order response to the to-be-processed delivery order may be any one of order receipt and order rejection. The order receipt may mean a response indicating that a delivery order will be processed based on the contents of the delivery order. The order rejection may mean a response indicating that the contents of a delivery order cannot be processed for a specific reason.

In one embodiment, numbers corresponding to the order receipt and the order rejection, respectively, may have been assigned. An employee or administrator of the company 300 may input an order response by pressing the number corresponding to the order receipt or the order rejection in the telephone 310. However, a method for an employee or administrator of the company 300 to input an order response to the to-be-processed delivery order is not limited to the above method. For example, an employee or administrator of the company 300 may input a response to an order through a phone call using voice, such as "receipt" or "rejection." In this case, the response reception module 140 may determine whether an order response is order receipt or order rejection through the voice recognition of voice received through a phone call.

Meanwhile, the delivery order response module 150 may transmit order processing result information corresponding to the order response to the orderer terminal 200 that has transmitted the to-be-processed delivery order.

The order processing result information corresponding to the order response may include information about whether the order response is order receipt or order rejection.

Meanwhile, in one embodiment, when the response reception module 140 receives an acceptance response to the to-be-processed delivery order, the voice output module 130 may output a voice that questions about an expected delivery time through the phone call. The voice that questions about the expected delivery time may include contents, for example, "Please select an expected delivery time. Please select No. 2 for 20 minutes, No. 3 for 30 minutes, No. 4 for 40 minutes, No. 5 for 50 minutes, No. 6 for 60 minutes or No. 9 for 90 minutes." An employee or administrator of the company 300 who has heard the voice that questions about the expected delivery time through the telephone 310 may input an expected delivery time using the same method (e.g., a method of inputting an expected delivery time by pressing a button of the telephone or through voice) as the method of inputting the order response through the phone call. The response reception module 140 may receive expected delivery time information from the company through the phone call. Meanwhile, in the present embodiment, the delivery order response module 150 may transmit the order processing result information, including the expected delivery time information, to the orderer terminal.

Meanwhile, in one embodiment, when the response reception module 140 receives a rejection response for the to-be-processed delivery order, the voice output module 130 may output a voice that questions about a receipt rejection reason through the phone call. The voice that questions about the receipt rejection reason may include contents, for example, "Please press No. 1 for a delivery-impossible area, No. 2 for a menu information change, No. 3 for a delivery condition change, No. 4 for delivery delay, No. 5 for inaccurate customer information, No. 6 for an establishment reason or No. 9 for other." An employee or administrator of the company 300 who has heard the voice that questions about the receipt rejection reason through the telephone 310 may input a receipt rejection reason using the same method (e.g., a method of inputting a receipt rejection reason by pressing a button of the telephone or through voice) as the method of inputting the order response through the phone call. The response reception module 140 may receive receipt rejection reason information from the company through the phone call. Meanwhile, in the present embodiment, the delivery order response module 150 may transmit the order processing result information, including the receipt rejection reason information, to the orderer terminal.

Figure 4:
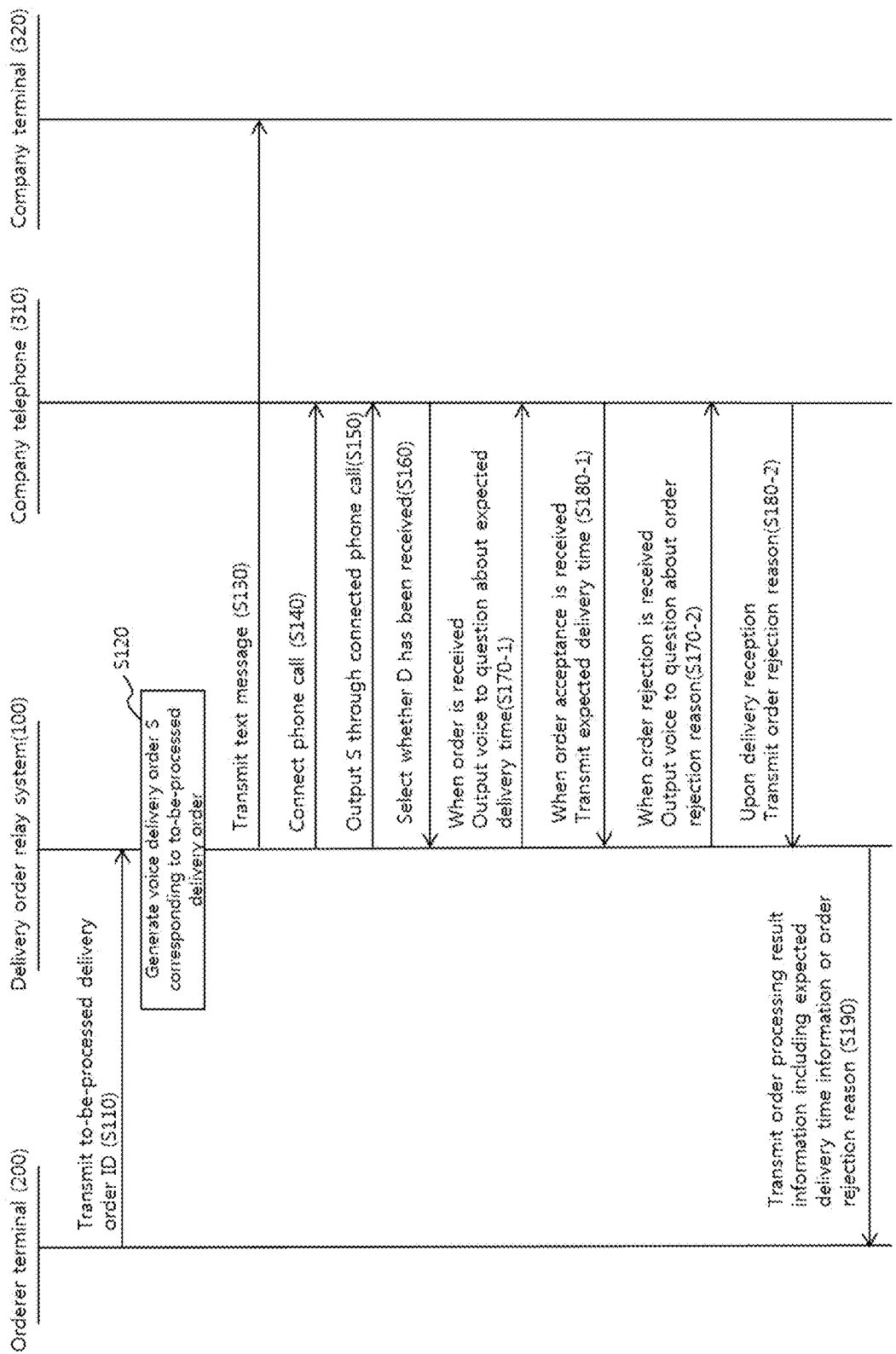
FIG. 4 is a flowchart showing an operational process of the delivery order relay system according to an embodiment of the present invention.

FIG. 4 is a flowchart showing a series of processes in which the orderer terminal 200 requests a delivery order and the delivery order relay system 100 transfers a delivery order to the company 300, receives a response to the delivery order and then reports the results of order processing to the orderer terminal 200.

Referring to FIG. 4, the orderer terminal 200 may transmit a to-be-processed delivery order ID to the delivery order relay system 100 (S110).

The delivery order relay system 100 that has received the to-be-processed delivery order D may generate a voice delivery order S, corresponding to the to-be-processed delivery order D, through TTS (S120).

Meanwhile, the delivery order relay system 100 may transmit a text message, including the order contents of the to-be-processed delivery order D, to the terminal 320 of the company 300 (S130) and connect a phone call to the telephone 320 of the company 300 (S140). When the phone call is connected, the delivery order relay system 100 may output the generated voice delivery order S through the connected phone call (S150).

Meanwhile, an employee or administrator of the company 300 may select whether the delivery order has been received or not through the telephone 310 of the company and transmit the selected results to the delivery order relay system 100 (S160).

If the delivery order relay system 100 has received the receipt of the delivery order, the delivery order relay system 100 may output a voice that questions about an expected delivery time through the phone call (S170-1). An employee or administrator of the company 300 may transmit the expected delivery time through the telephone 310 of the company (S180-1).

If the delivery order relay system 100 has received the rejection of the delivery order, the delivery order relay system 100 may output a voice that questions about an order rejection reason through the phone call (S170-2). An employee or administrator of the company 300 may transmit the order rejection reason through the telephone 310 of the company (S180-2).

Meanwhile, the delivery order relay system 100 may transmit order processing result information, including the expected delivery time information or the order rejection reason, to the orderer terminal 200 (S190).

Meanwhile, in order to relay one delivery order, all of voices corresponding to the delivery order must be output. Accordingly, in order to process the delivery order, time is taken to output a voice corresponding to a minimum delivery order. However, a plurality of delivery orders may be requested by a plurality of orderer terminals (e.g., at least two of 200 to 200-N) at the same time or within a short period. Accordingly, it is necessary for the delivery order relay system 100 to manage a plurality of delivery orders.

To this end, in one embodiment, the addition module 160 may add a to-be-processed delivery order, received from the orderer terminal 200, to a task queue of a first-in first-out method. The extraction module 165 may extract a delivery order from the task queue in order of addition. If the to-be-processed delivery order is to be next extracted from the task queue, the extraction module 165 may extract the to-be-processed delivery order from the task queue.

Meanwhile, when the processing task of the to-be-processed delivery order is extracted from the task queue by the extraction module 165, the control module 195 may connect a phone call to a company corresponding to the to-be-processed delivery order and control the voice output module 130 so that it outputs the voice delivery order through the connected phone call.

Meanwhile, an orderer who has requested a delivery order may cancel the order. To this end, the cancellation request reception module 170 may receive a cancellation request for a to-be-processed delivery order from the orderer terminal 200 that has transmitted the to-be-processed delivery order. The cancellation module 180 may perform a cancellation task on the to-be-processed delivery order in response to the cancellation request for the to-be-processed delivery order.

The cancellation task may be different depending on whether a phone call has been connected to the company 300 corresponding to the to-be-processed delivery order or not.

If a phone call has not yet been connected to the company 300 corresponding to the to-be-processed delivery order, the cancellation module 180 may delete the to-be-processed delivery order from the task queue so that the to-be-processed delivery order is not delivered through a phone call.

If the voice delivery order is being output through a phone call connected to a company corresponding to the to-be-processed delivery order, the cancellation module 180 may add a cancellation message transmission task for the to-be-processed delivery order to the task queue. The cancellation message transmission task for the to-be-processed delivery order needs to be rapidly processed. In particular, the cancellation module 180 may add a cancellation message transmission task for the to-be-processed delivery order to the task queue with top priority so that the cancellation message transmission task for the to-be-processed delivery order is processed earlier than other tasks that have been previously added.

Meanwhile, if the cancellation message transmission task for the to-be-processed delivery order has been extracted by the extraction module 165, the control module 195 may transmit a cancellation instruction message for the to-be-processed delivery order corresponding to the cancellation request for the to-be-processed delivery order to the terminal 320 of the company 300 so that an employee or administrator of the company 300 can be aware that the to-be-processed delivery order has been cancelled. Meanwhile, in order to transmit the cancellation instruction message for the to-be-processed delivery order to the terminal 320 of the company 300, the control module 195 may control the text message transmission module 135 so that it transmits the cancellation instruction message for the to-be-processed delivery order corresponding to the cancellation request for the to-be-processed delivery order to the terminal 320 of the company 300.

Meanwhile, the cancellation module 180 may perform the cancellation task on the to-be-processed delivery order only if a specific cancellable period has not elapsed.

In one embodiment, the cancellable period may be a period before an order response to the to-be-processed delivery order is received from the company 300. The reason for this is that if the company has made the order response to the to-be-processed delivery order, preparation for processing the to-be-processed delivery order may have already been started.

Meanwhile, while a delivery order voice is output through a phone call, an exception situation, such as that the connection of the phone call is hung up or the company 300 does not answer, may occur. A method of processing, by the delivery order relay system 100 according to an embodiment of the present invention, such as an exception situation is described below with reference to FIGS. 5 and 6.

Figure 5:
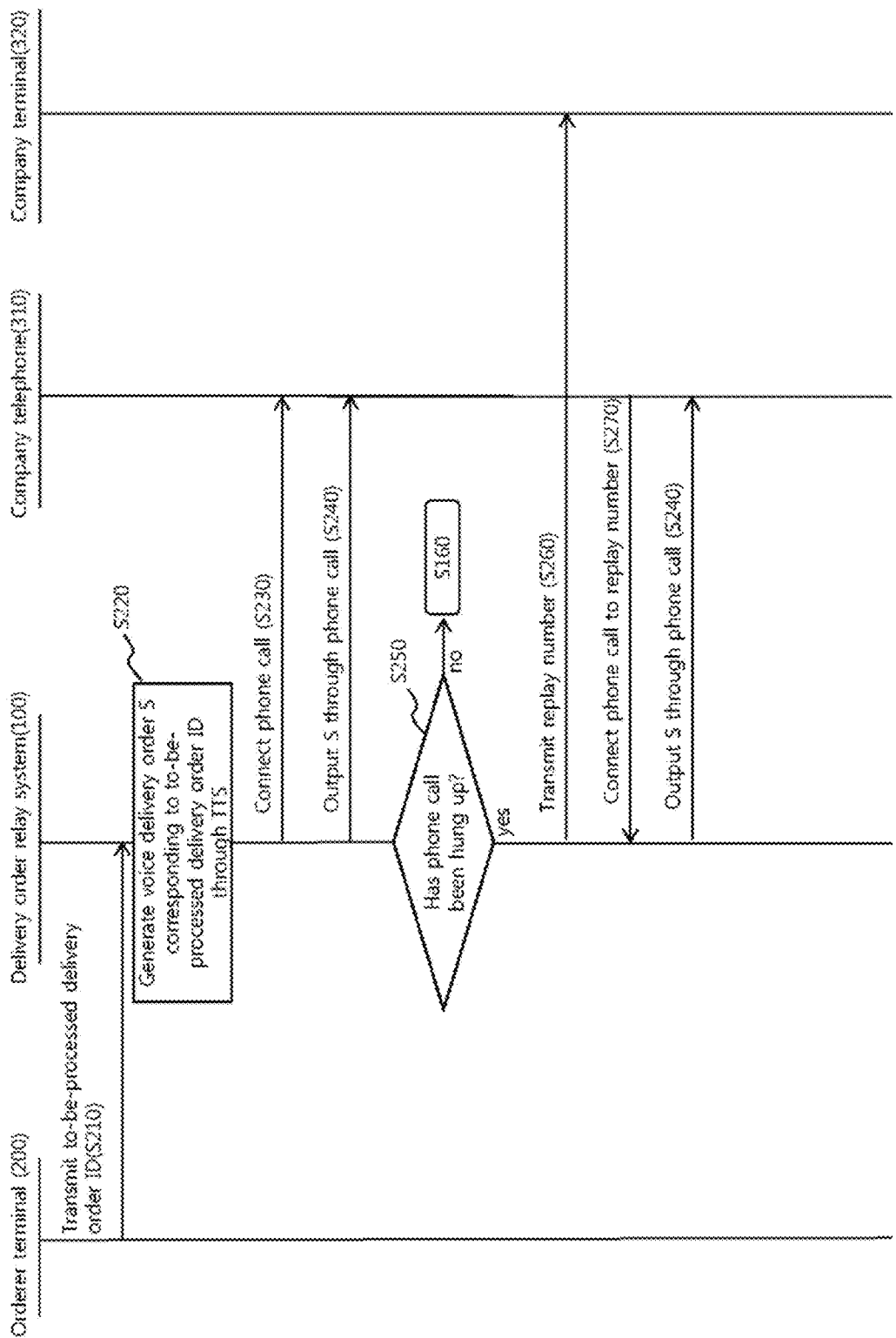
FIG. 5 is a flowchart showing a method of an operation of the delivery order relay system according to an embodiment of the present invention when a phone call is hung up while a voice delivery order is output.

FIG. 5 is a flowchart showing a method of an operation of the delivery order relay system 100 when a phone call is hung up while a voice delivery order is output.

When the orderer terminal 200 transmits a to-be-processed delivery order ID (S210), the TTS module 120 may generate a voice delivery order S corresponding to the to-be-processed delivery order ID through TTS (S220). The voice output module 130 may connect a phone call to the telephone 310 of a company (S230) and output the voice delivery order S (S240).

Meanwhile, the voice output module 130 may determine whether the phone call is hung up or not while the voice delivery order is output through the phone call (S250). If the phone call is hung up while the voice delivery order is output through the phone call, the replay number transmission module 190 may transmit a replay number to the terminal 320 of the company (S260). When an employee or administrator of the company 300 who has checked the received replay number connects the phone call to the delivery order relay system by making a phone call to the replay number (S270), the voice output module 130 may output the voice delivery order again through the connected phone call so that the order relay process resumes (S240).

Figure 6:
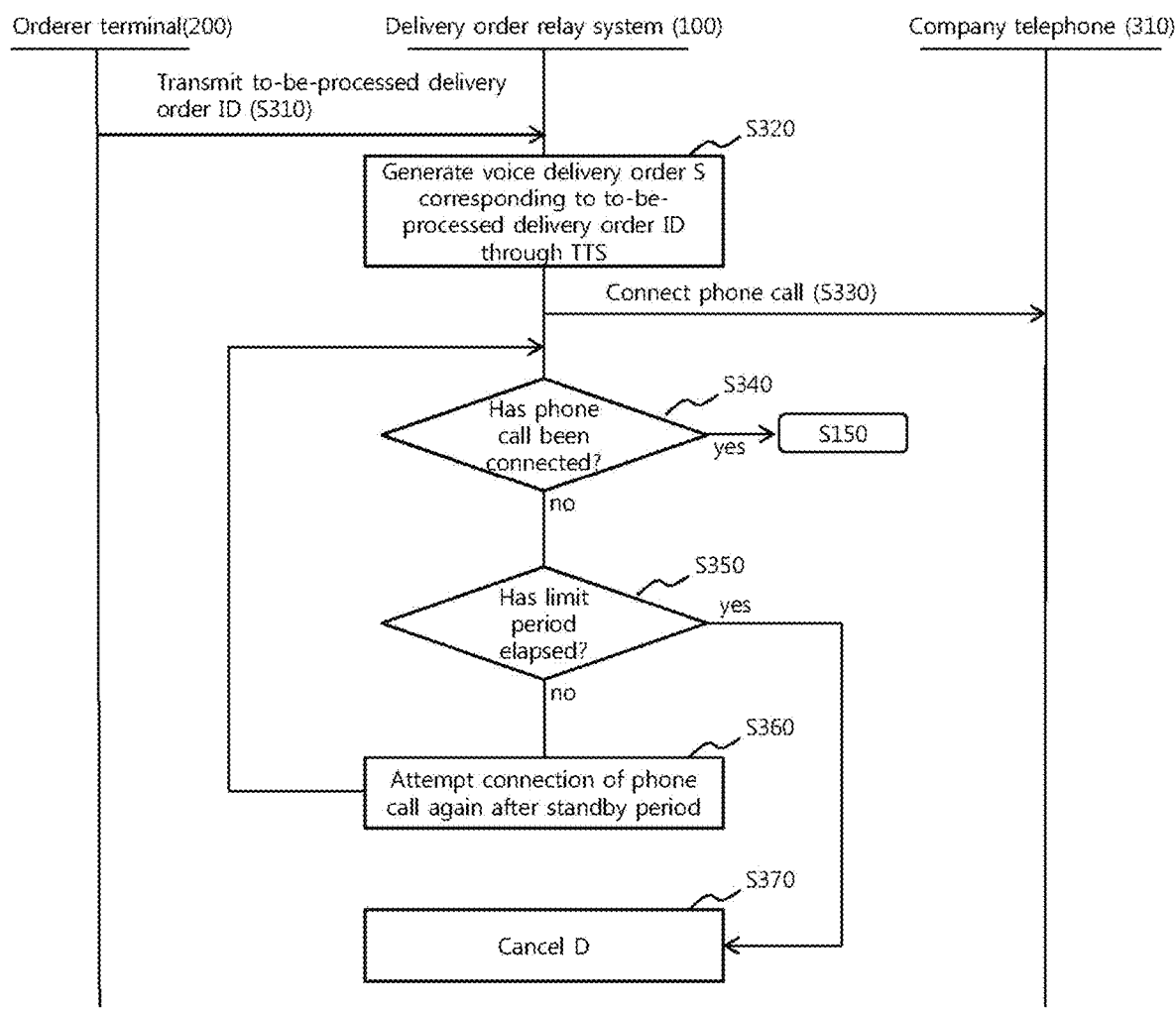
FIG. 6 is a flowchart showing a method of an operation of the delivery order relay system according to an embodiment of the present invention when a phone call is not received by a company.

FIG. 6 is a flowchart showing a method of an operation of the delivery order relay system 100 when a phone call is not received by the company 300.

Referring to FIG. 6, when the orderer terminal 200 transmits a to-be-processed delivery order ID (S310), the TTS module 120 may generate a voice delivery order S corresponding to the to-be-processed delivery order ID through TTS (S320). The voice output module 130 may connect a phone call to the telephone 310 of the company 300 (S330).

If the phone call and the telephone 310 of the company 300 are not connected (S340), the voice output module 130 may attempt the connection of the phone call to the company again after a specific standby period (e.g., 1 minute) elapses (S360) and may attempt the connection of the phone call every standby period until the company 300 answers the phone.

If the phone call is not connected to the company within a specific limit period (e.g., 10 minutes) after the first phone call connection attempt for the company (S350), the cancellation module 180 may cancel the to-be-processed delivery order (S370).

Meanwhile, in some implementation examples, the delivery order relay system 100 may include a processor and memory for storing a program executed by the processor. The processor may include a single core CPU or a multi-core CPU. The memory may include high-speed random access memory, and may include one or more magnetic disk storage devices, flash memory devices or non-volatile memory, such as other non-volatile solid state memory devices. Access to the memory by the processor and other elements may be controlled by a memory controller. In this case, when the program is executed by the processor, it may enable the delivery order relay system 100 according to the present embodiment to perform the method of providing the delivery order relay system.

Meanwhile, the method of providing the delivery order relay system according to an embodiment of the present invention may be implemented in the form of computer-readable program code and may be stored in a computer-readable recording medium. The computer-readable recording medium includes all of kinds of recording devices in which data readable by a computer system is stored.

The program code recorded on the recording medium may have been specifically designed and configured for the present invention or may have been known to and may be used by those skilled in the software field.

Examples of the computer-readable recording medium include magnetic media such as a hard disk, a floppy disk and a magnetic tape, optical media such as CD-ROM and a DVD, magneto-optical media such as a floptical disk, ROM, RAM, and flash memory, and hardware devices specially configured to store and execute program code. Furthermore, the aforementioned medium may be a transmission medium, such as light including a carrier for sending a signal that designates program code, a data structure, etc., a metal line or a waveguide. Furthermore, the computer-readable recording medium may be distributed to computer systems connected over a network, and the computer-readable code may be stored and executed in a distributed manner.

An example of the program code includes not only machine code, such as that produced by a compiler, but also high-level language code executable by a device for electronically processing information using an interpreter, for example, a computer.

The aforementioned hardware device may be configured to operate as one or more software modules in order to perform the operation of the present invention, and vice versa.

The aforementioned description is illustrative, and those skilled in the art to which the present invention pertains will understand that the present invention may be implemented in other detailed forms without departing from the technological spirit or essential characteristics of the present invention.

Accordingly, the aforementioned embodiments should be construed as being only illustrative not as being restrictive from all aspects. For example, each of the elements described in the singular form may be distributed and implemented. Likewise, the elements that have been illustrated as being distributed may also be implemented in a combined form.

The range of right of the present invention is defined by the appended claims rather than the detailed description, and the present invention should be construed as covering all modifications or variations derived from the meaning and scope of the appended claims and their equivalents.

INDUSTRIAL APPLICABILITY

The present invention may be used in a delivery order relay system and method using TTS.

The invention claimed is:

1. A delivery order system using text to speech (TTS), comprising:
    at least one processor; and
    at least one memory storing instructions, the instructions configured to cause the delivery order system to:
        receive, from a user terminal, an online order comprising text for a delivery of an item from a store to a designated place,
        cause a computerized device to make a telephone call to a store telephone at the store,
        when a store person at the store answers the telephone call, cause the computerized device to place a voiced order by TTS to the store telephone, wherein the voiced order comprises one or more verbal expressions generated using TTS and corresponding to the text of the online order,
        receive, from the user, an online cancelation request for cancelling the online order, and
        when the online cancelation request is received while the computerized device is placing by TTS the voiced order to the store telephone, transmit, to a store computing terminal of the store that is separate from the store telephone, a cancellation message for cancelling the voiced order such that the store is notified cancellation of the voiced order via the store computing terminal rather than the store telephone.

2. The delivery order system of claim 1, wherein the instructions are configured to cause the delivery order system further to:
    when the telephone call is disconnected while the computerized device is placing the voiced order to the store person, send a reply telephone number to the store computing terminal;
    subsequently when the store person makes a call to the reply telephone number, cause the computerized device to place the voiced order to the store person.

3. The delivery order system of claim 1, wherein the instructions are configured to cause the delivery order system further to:
    when the voiced order has been placed via the telephone call, sending, to the store computing terminal, a confirmation message corresponding to the online order.

4. A method of handling online orders for delivery service using text to speech (TTS), the method comprising:
    receiving, from a user terminal, an online order comprising text for a delivery of an item from a store to a designated place;
    causing a computerized device to make a telephone call to a store telephone at the store;
    when a store person at the store answers the telephone call, causing the computerized device to place a voiced order by TTS to the store telephone, wherein the voiced order comprises one or more verbal expressions generated using TTS and corresponding to the text to the online order;
    receiving, from the user, an online cancelation request for cancelling the online order; and
    when the online cancelation request is received while the computerized device is placing by TTS the voiced order to the store telephone, transmitting, to a computing terminal of the store that is separate from the store telephone, a cancellation message for cancelling the voiced order such that the store is notified with cancellation of the voiced order via the store computing terminal rather than the store telephone.

5. The method of claim 4, further comprising:
    when the telephone call is disconnected while the computerized device is placing the voiced order to the store person, sending a reply telephone number to the store computing terminal;
    subsequently when the store person makes a call to the reply telephone number, causing the computerized device to place the voiced order to the store person.

6. The delivery order relay method of claim 4, further comprising:
    when the voiced order has been placed via the telephone call, sending, to the store computing terminal, a confirmation message corresponding to the online order.

7. A non-transitory computer-readable medium storing computer-executable program for performing the method according to claim 4.

* * * * *